(12) United States Patent
Kolze

(10) Patent No.: US 9,774,419 B2
(45) Date of Patent: Sep. 26, 2017

(54) INBAND SPURIOUS DETECTION AND PROCESSING WITHIN COMMUNICATION SYSTEMS

(71) Applicant: BROADCOM CORPORATION, Irvine, CA (US)

(72) Inventor: Thomas Joseph Kolze, Phoenix, AZ (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 219 days.

(21) Appl. No.: 14/675,560

(22) Filed: Mar. 31, 2015

(65) Prior Publication Data

US 2017/0063489 A1     Mar. 2, 2017

Related U.S. Application Data

(60) Provisional application No. 61/978,164, filed on Apr. 10, 2014.

(51) Int. Cl.
| | | |
|---|---|---|
| *H04L 1/00* | (2006.01) | |
| *H04L 1/20* | (2006.01) | |
| *H04L 1/24* | (2006.01) | |
| *H04B 17/318* | (2015.01) | |
| *H04B 17/345* | (2015.01) | |

(52) U.S. Cl.
CPC ......... *H04L 1/0015* (2013.01); *H04B 17/318* (2015.01); *H04B 17/345* (2015.01); *H04L 1/0046* (2013.01); *H04L 1/208* (2013.01); *H04L 1/242* (2013.01)

(58) Field of Classification Search
CPC ......... H04L 1/0015; H04M 3/26; H04M 3/28; H04M 3/30; H04M 3/304
See application file for complete search history.

(56) References Cited

U.S. PATENT DOCUMENTS

| | | | |
|---|---|---|---|
| 6,470,044 B1 * | 10/2002 | Kowalski | H04B 1/7107 370/201 |
| 7,155,218 B1 * | 12/2006 | Fessler | H04W 24/00 455/424 |

(Continued)

*Primary Examiner* — David B. Lugo
(74) *Attorney, Agent, or Firm* — Garlick & Markison; Shayne X. Short

(57) ABSTRACT

A communication device receives a transmitted signal from another communication device. This transmitted signal is generated within the another communication device based on predetermined digital data. The communication device then generates a first reference signal based on a copy of the predetermined digital data and subtracts the first reference signal from the transmitted signal to generate a first residual signal. The communication device then identifies at least one adaptation parameter based on the first residual signal and adapts the first reference signal using the at least one adaptation parameter to generate a second reference signal so that a first characteristic of the transmitted signal and a second characteristic of the second reference signal are approximately equal. The communication device then subtracts the second reference signal from the transmitted signal to generate a second residual signal processes the second residual signal to characterize inband spurious emission within the transmitted signal.

22 Claims, 8 Drawing Sheets

(56) References Cited

U.S. PATENT DOCUMENTS

| | | | | |
|---|---|---|---|---|
| 2010/0266000 A1* | 10/2010 | Froimovich | ............ | H04B 15/02 375/222 |
| 2012/0183031 A1* | 7/2012 | Kolze | ...................... | H04B 1/10 375/224 |
| 2014/0254407 A1* | 9/2014 | Williams | .............. | H04W 24/06 370/252 |

* cited by examiner

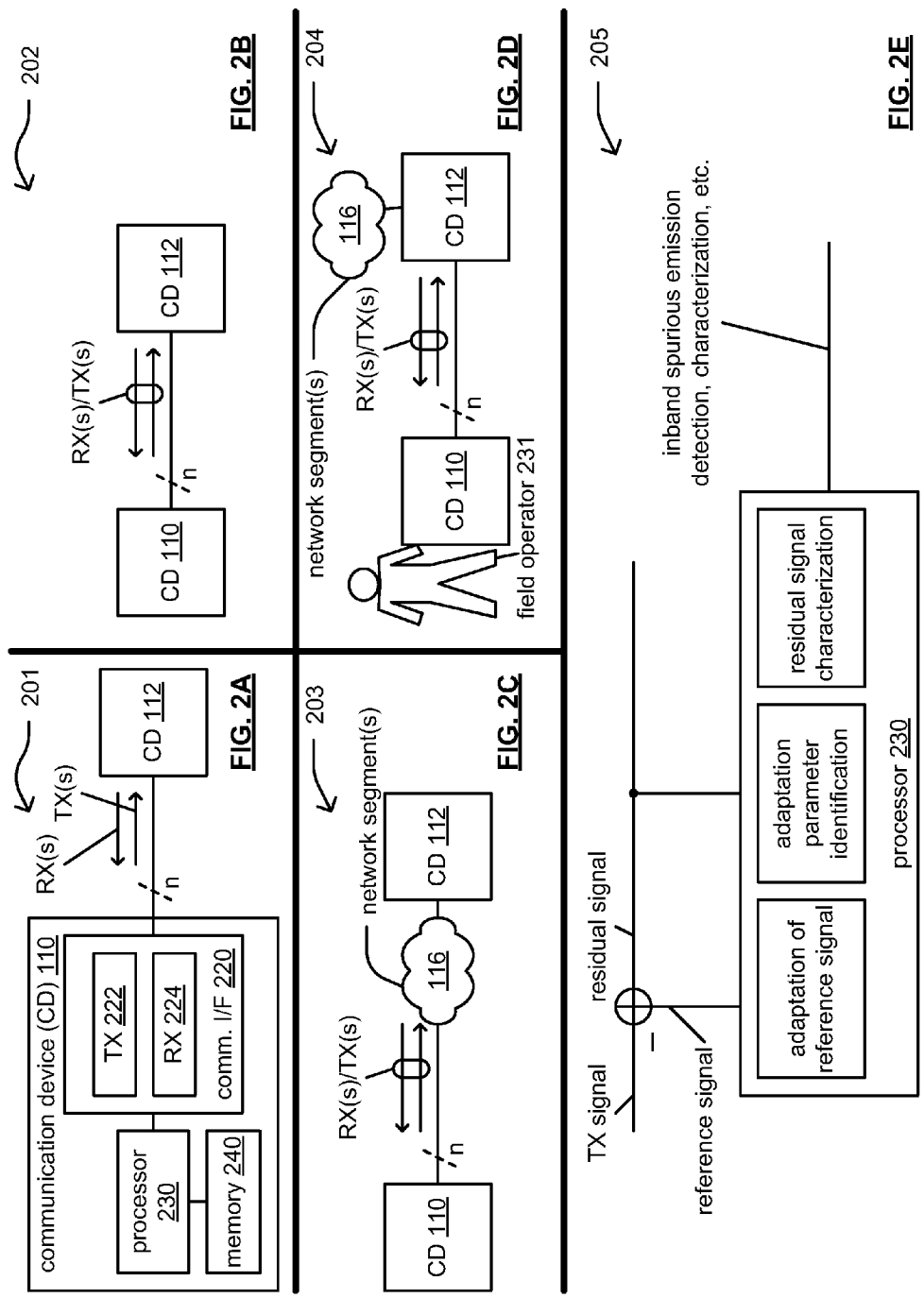

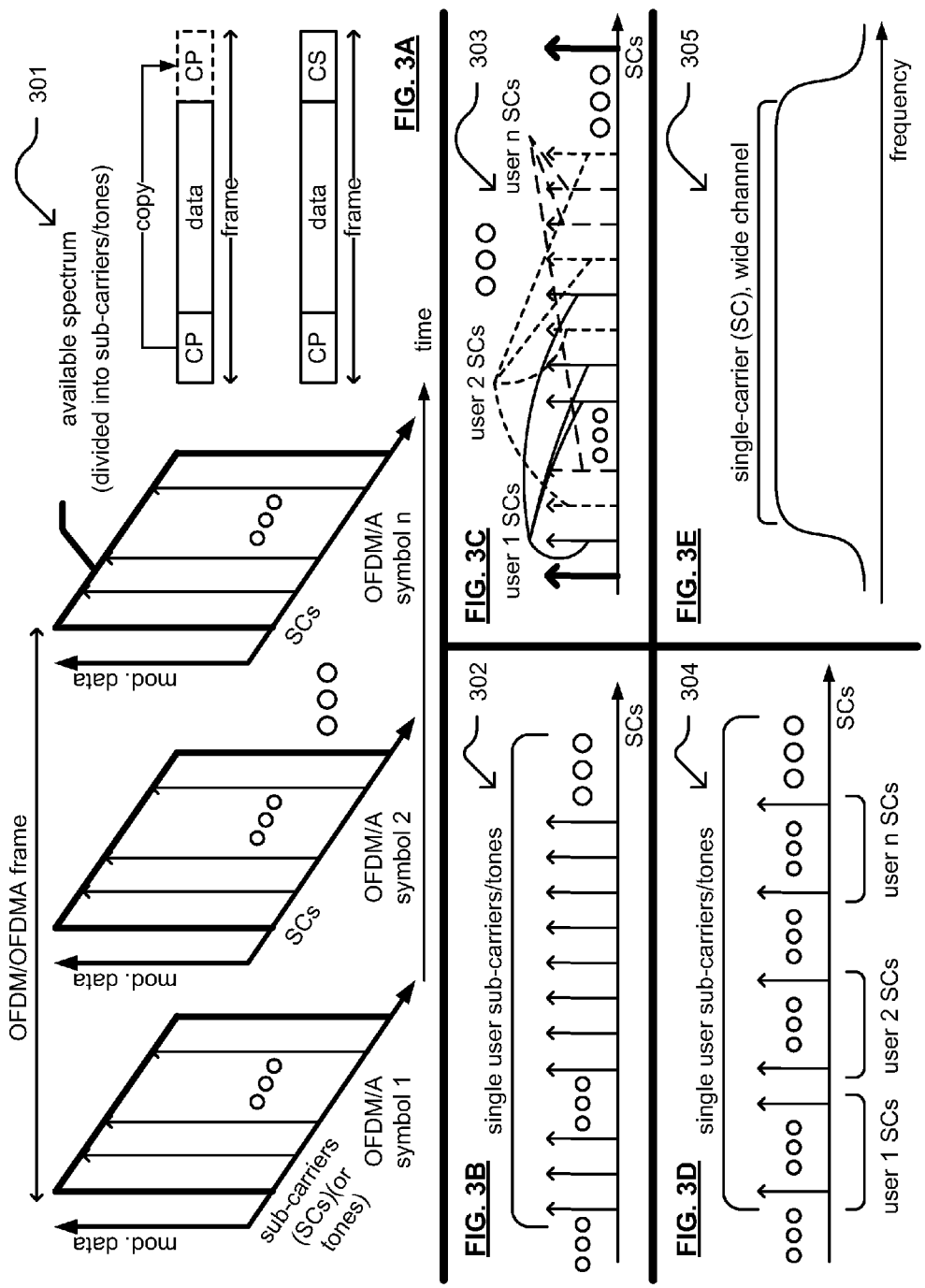

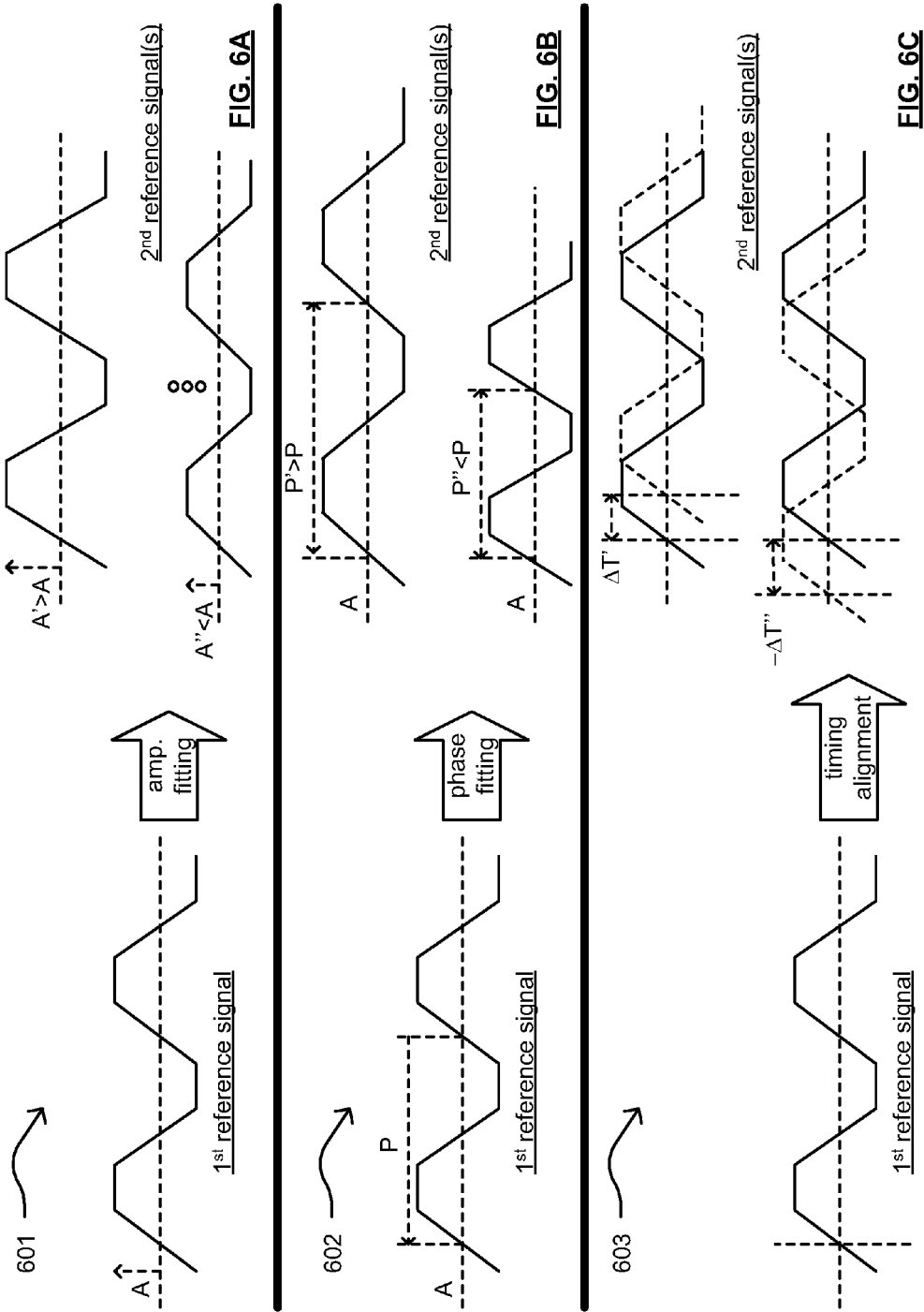

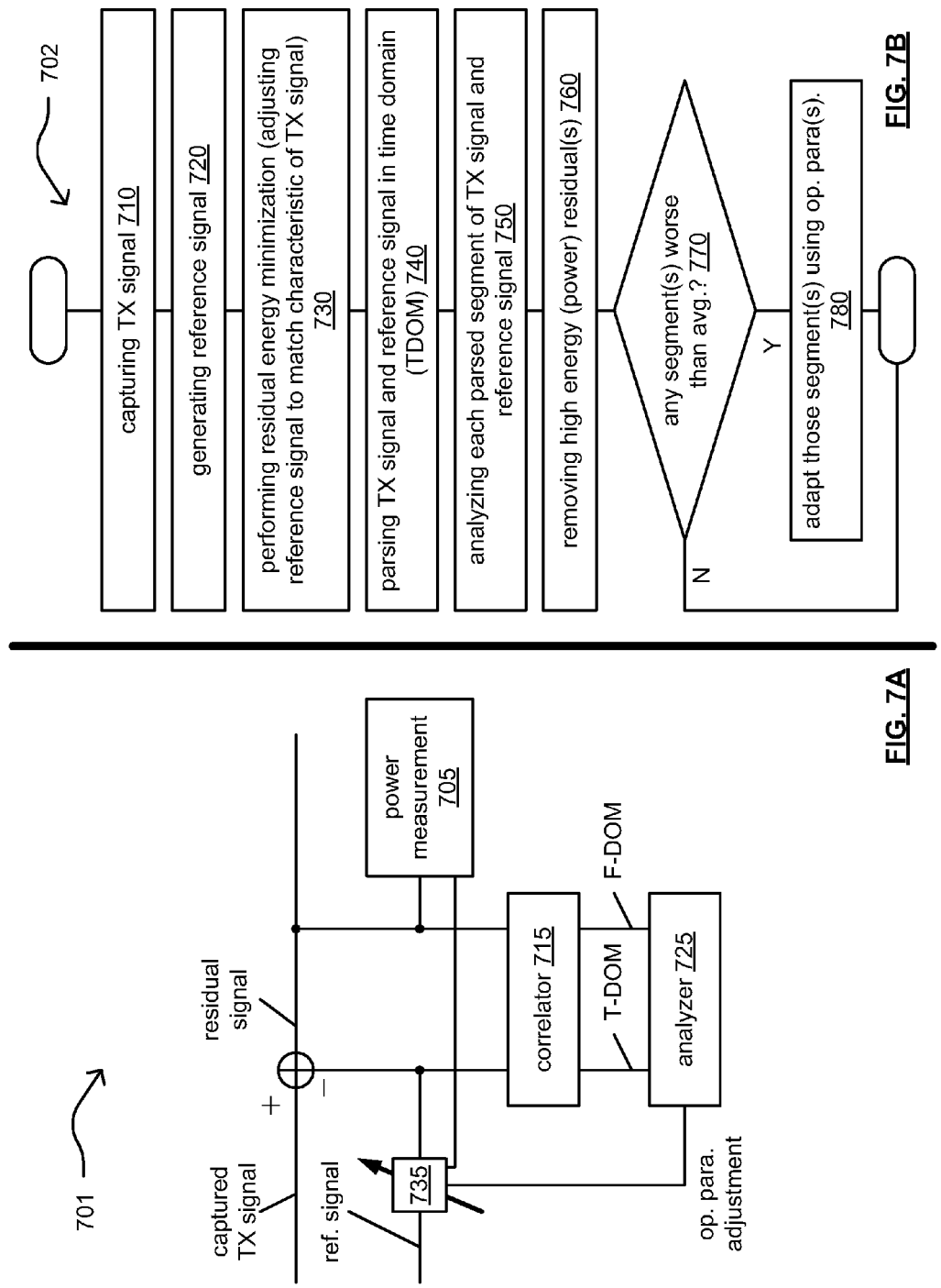

INBAND SPURIOUS DETECTION AND PROCESSING WITHIN COMMUNICATION SYSTEMS

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Application No. 61/978,164, entitled "Inband Spurious Detection and Processing within Communication Systems," filed Apr. 10, 2014, which is hereby incorporated herein by reference in its entirety and made part of the present U.S. Utility Patent Application for all purposes.

BACKGROUND

Technical Field

The present disclosure relates generally to communication systems; and, more particularly, to spurious emission characterization of signals and communication devices within such communication systems.

Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of adverse effects include interference and noise that may be caused by various sources including other communications, low-quality links, degraded or corrupted interfaces and connectors, etc.

In addition, certain communication devices within such communication systems can be adversely affected by interference, noise, etc. When such affected-communication devices are included within a communication system, signals transmitted by those affected-communication devices will also adversely affect communications in the communication system. The prior art does not provide adequate means by which a communication device's operation can be characterized to determine the degree to which it is affected by such interference, noise, etc. There continues be a great deal of room for improvement for new and better means to determine such deleterious effects within communication systems and communication devices.

BRIEF DESCRIPTION OF THE SEVERAL VIEWS OF THE DRAWINGS

FIG. 2A is a diagram illustrating an example of a communication device (CD) operative within one or more communication systems.

FIG. 2B is a diagram illustrating another example of a CD operative within one or more communication systems.

FIG. 2C is a diagram illustrating another example of a CD operative within one or more communication systems.

FIG. 2D is a diagram illustrating another example of a CD operative within one or more communication systems.

FIG. 2E is a diagram illustrating an example of processing to characterize spurious emissions that may exist in a signal transmitted from a CD.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 6A is a diagram illustrating an example of reference signal adaptation using amplitude fitting.

FIG. 6B is a diagram illustrating an example of reference signal adaptation using phase fitting.

FIG. 6C is a diagram illustrating an example of reference signal adaptation using timing alignment.

FIG. 7A is a diagram illustrating an example of reference signal removal from a transmitted signal to generate a residual signal including adaptation of the reference signal.

FIG. 7B is a diagram illustrating an embodiment of a method for execution by one or more communication devices and that performs reference signal removal from a transmitted signal to generate a residual signal using parsing.

DETAILED DESCRIPTION

Figure 1A:
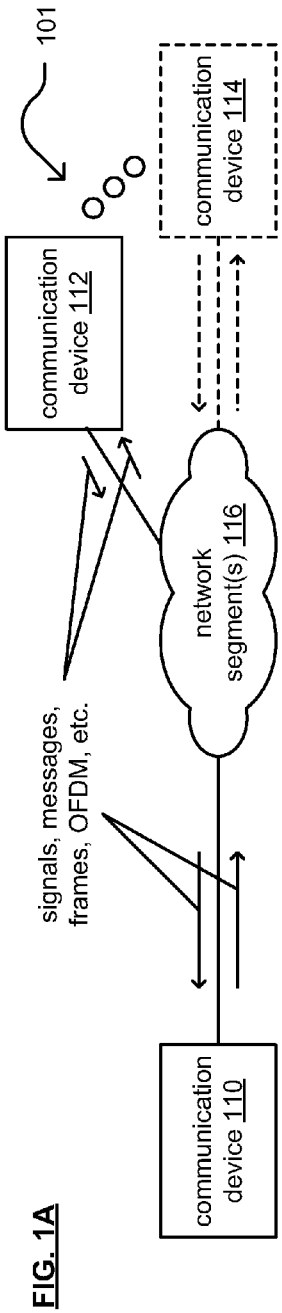
FIG. 1A is a diagram illustrating an embodiment of one or more communication systems.

FIG. 1A is a diagram illustrating an embodiment 101 of one or more communication systems. One or more network segments 116 provide communication inter-connectivity for at least two communication devices 110 and 112 (also referred to as CDs in certain locations in the diagrams). Note that general reference to a communication device may be made generally herein using the term 'device' (e.g., device 110 or CD 110 when referring to communication device 110, or devices 110 and 112, or CDs 110 and 112, when referring to communication devices 110 and 112). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 112-114. This communication may be bidirectional/to and from the one or more of the other devices 112-114 or unidirectional (or primarily unidirectional) from the one or more of the other devices 112-114.

In an example of operation, one of the devices, such as device 110 (e.g., CD 110), includes a communication interface and a processor that cooperatively operate to support communications with another device, such as device 112, among others within the system. The processor is operative to generate and interpret different signals, frames, packets, symbols, etc. for transmission to other devices and that have been received from other devices.

In an example, device 110 (CD 110) includes a communication interface and a processor. The CD 110 (e.g., using its processor and communication interface) is configured to receive a transmitted signal from another communication device (e.g., CD 112). This transmitted signal is generated within the another communication device (e.g., CD 112) based on predetermined digital data. The one or more network segments 116 is a direct link in one example, a single communication link in another example, a multiple-hop communication pathway (e.g., more than one communication link) in yet another example, a direct connection in yet another example, a connection made by an operator with a test device or test equipment yet another example, etc. Generally, any of a number of configuration may be used for the CD 110 to receive a transmitted signal from another communication device (e.g., CD 112). Then, the CD 110 generates a first reference signal based on a copy of the predetermined digital data and subtracts the first reference signal from the transmitted signal to generate a first residual signal. The CD 110 identifies at least one adaptation parameter based on the first residual signal and adapts the first reference signal using the at least one adaptation parameter to generate a second reference signal so that a first characteristic of the transmitted signal and a second characteristic of the second reference signal are approximately equal. Note that any one or more of a number of characteristics may be used in comparison of the transmitted signal and the reference signal (e.g., energy, power, signal shape, waveform shape, signal type, phase, periodicity, amplitude, etc. and/or any other characteristic by which a signal may be characterized. Note also that any one or more of such characteristics may be used in the comparison of the transmitted signal and the reference signal(s) (e.g., first and/or second reference signals).

In one example of operation, the CD 110 identifies at least one adaptation parameter based on the first residual signal and adapts the first reference signal using the at least one adaptation parameter to generate a second reference signal so that a first power of the transmitted signal and a second power of the second reference signal are approximately equal. In another example of operation, the CD 110 identifies at least one adaptation parameter based on the first residual signal and adapts the first reference signal using the at least one adaptation parameter to generate a second reference signal so that a first waveform shape of the transmitted signal and a second waveform shape of the second reference signal are approximately equal. In yet another example of operation, the CD 110 identifies at least one adaptation parameter based on the first residual signal and adapts the first reference signal using the at least one adaptation parameter to generate a second reference signal so that a first signal type of the transmitted signal and a second signal type of the second reference signal are approximately equal. In even another example of operation, the CD 110 identifies at least one adaptation parameter based on the first residual signal and adapts the first reference signal using the at least one adaptation parameter to generate a second reference signal so that a first power and a first waveform shape of the transmitted signal and a second power and a second waveform shape of the second reference signal are approximately equal.

Then, the CD 110 subtracts the second reference signal from the transmitted signal to generate a second residual signal and processes the second residual signal to characterize inband spurious emission within the transmitted signal. Generally, the CD 110 operates to minimize the one or more characteristics of the transmitted signal and the second reference signal so that such a characteristic is minimized with respect to the reference signal. From an alternative perspective, the CD 110 operates to identify at least one adaptation parameter based on the first residual signal and to adapt the first reference signal using the at least one adaptation parameter to generate a second reference signal so that the transmitted signal and the second reference signal are approximately equal (e.g., based on the one or more characteristics used to perform such matching).

In other examples, the CD 110 may obtain or generate the (original) reference signal in a manner of ways and embodiments in addition to being provided a complete description of predetermined digital data. The transmitted signal provided into the CD 110 from the CD 112 is typically a high signal to noise ratio (SNR) input enabling reliable estimation of any unknowns in the transmitted signal. Note that the when there are fewer the unknowns in the transmitted signal provided from CD 112, then the CD 110 can perform better matching of the (original) reference signal with the transmitted signal.

In various examples, the CD 110 performs such adaptation of the first reference signal using any one or more of a number of types of processing, adapting, etc. The CD 110 performs such adapting of the first reference signal using any one or more of amplitude fitting, phase fitting, and/or timing alignment to generate the second reference signal so that the first characteristic of the transmitted signal and the second characteristic of the second reference signal are approximately equal. The constraint of determining that the first reference signal and the second reference signal have approximately equal power can be within 1%, 2%, 5%, or generally approximately equal within a degree of N %, where N is any desired number including a number less great than 0 and less than 1.

In some examples, the CD 110 processes the second residual signal using iterative processing to characterize inband spurious emission within the transmitted signal and filters the second residual signal during a first iteration to generate a first filtered residual signal. The CD then compares the first filtered residual signal to a threshold to determine a first measure of the inband spurious emission and filters the first filtered residual signal during a second iteration to generate a second filtered residual signal. The CD 110 then compares the second filtered residual signal to the threshold or another threshold (e.g., compares to any one or more thresholds) to determine a second measure of the inband spurious emission.

In other examples, the CD 110 performs forward error correction (FEC) decoding of the transmitted signal to generate an estimate of the transmitted signal and soft information associated with the transmitted signal and identifies the at least one adaptation parameter based on the first residual signal, the estimate of the transmitted signal, and the soft information associated with the transmitted signal.

Note that the CD 112 that provides the transmitted signal to CD 110 can be any of a variety of types of communication devices including a cable modem implemented within a cable-based communication system, a communication device implemented within a test facility (e.g., such as a cable modem in a test environment before being shipped or sold to a customer), etc. The CD 110 that receives the transmitted signal from the CD 112 can be any of a variety of types of communication devices including a mobile test communication device configured to receive the transmitted signal during a first time period and to receive another transmitted signal during a second time period.

Figure 1B:
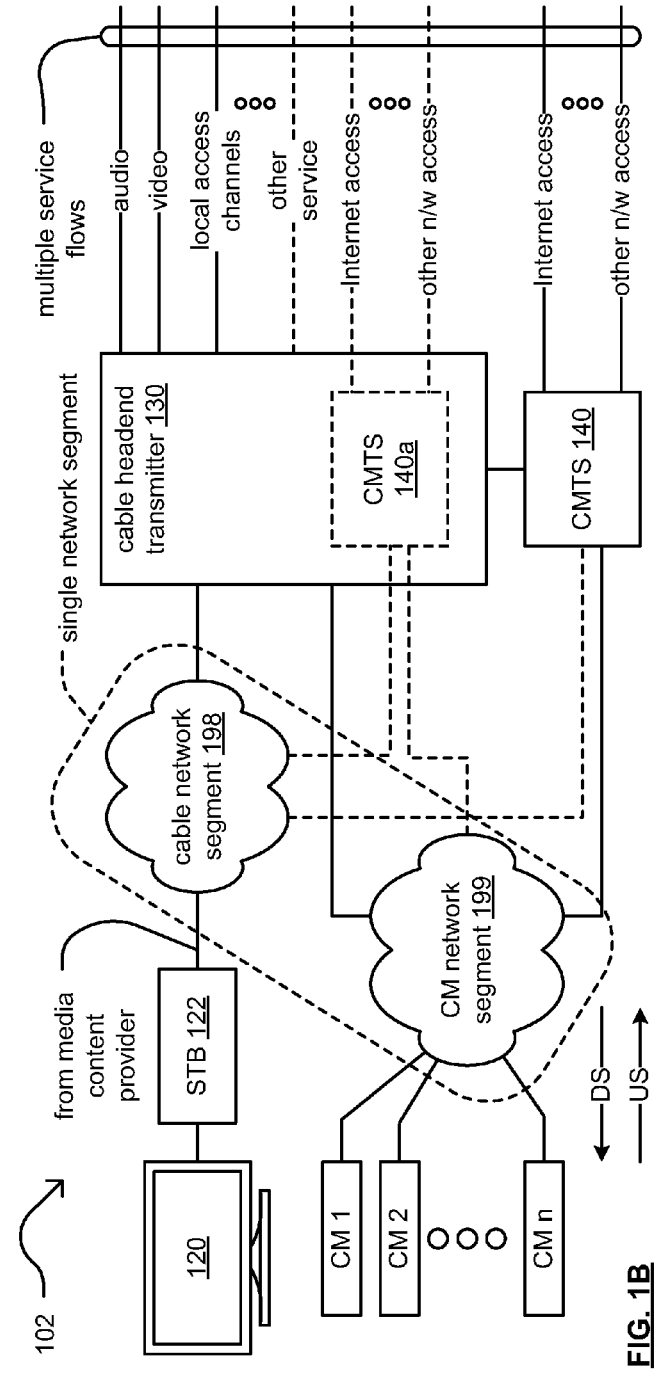
FIG. 1B is a diagram illustrating another embodiment of one or more communication systems.

FIG. 1B is a diagram illustrating another embodiment 102 of one or more communication systems. A cable headend transmitter 130 provides service to a set-top box (STB) 122 via cable network segment 198. The STB 122 provides output to a display capable device 120. The cable headend transmitter 130 can support any of a number of service flows such as audio, video, local access channels, as well as any other service of cable systems. For example, the cable headend transmitter 130 can provide media (e.g., video and/or audio) to the display capable device.

The cable headend transmitter 130 may provide operation of a cable modem termination system (CMTS) 140a. For example, the cable headend transmitter 130 may perform such CMTS functionality, or a CMTS may be implemented separately from the cable headend transmitter 130 (e.g., as shown by reference numeral 140). The CMTS 140 can provide network service (e.g., Internet, other network access, etc.) to any number of cable modems (shown as CM 1, CM 2, and up to CM n) via a cable modem (CM) network segment 199. The cable network segment 198 and the CM network segment 199 may be part of a common network or common networks. The cable modem network segment 199 couples the cable modems 1-n to the CMTS (shown as 140 or 140a). Such a cable system (e.g., cable network segment 198 and/or CM network segment 199) may generally be referred to as a cable plant and may be implemented, at least in part, as a hybrid fiber-coaxial (HFC) network (e.g., including various wired and/or optical fiber communication segments, light sources, light or photo detection components, etc.).

A CMTS 140 (or 140a) is a component that exchanges digital signals with cable modems 1-n on the cable modem network segment 199. Each of the cable modems is coupled to the cable modem network segment 199, and a number of elements may be included within the cable modem network segment 199. For example, routers, splitters, couplers, relays, and amplifiers may be contained within the cable modem network segment 199. Generally speaking, downstream information may be viewed as that which flows from the CMTS 140 to the connected cable modems (e.g., CM 1, CM2, etc.), and upstream information as that which flows from the cable modems to the CMTS 140.

In an example of operation, CM 1 includes a communication interface and a processor. The CM 1 receives a transmitted signal from CMTS 140. The CMTS 140 generates the transmitted signal based on predetermined digital data. The CM 1 generates a first reference signal based on a copy of the predetermined digital data and subtracts the first reference signal from the transmitted signal to generate a first residual signal. The CM 1 identifies at least one adaptation parameter based on the first residual signal and adapts the first reference signal using the at least one adaptation parameter to generate a second reference signal so that a first characteristic of the transmitted signal and a second characteristic of the second reference signal are approximately equal. The CM 1 subtracts the second reference signal from the transmitted signal to generate a second residual signal processes the second residual signal to characterize inband spurious emission within the transmitted signal.

In another example of operation, CMTS 140a includes a communication interface and a processor. The CMTS 140a receives a transmitted signal from CM 2 (or STB 122). The CM 2 (or STB 122) generates the transmitted signal based on predetermined digital data. The CMTS 140a generates a first reference signal based on a copy of the predetermined digital data and subtracts the first reference signal from the transmitted signal to generate a first residual signal. The CMTS 140a identifies at least one adaptation parameter based on the first residual signal and adapts the first reference signal using the at least one adaptation parameter to generate a second reference signal so that a first characteristic of the transmitted signal and a second characteristic of the second reference signal are approximately equal. The CMTS 140a subtracts the second reference signal from the transmitted signal to generate a second residual signal processes the second residual signal to characterize inband spurious emission within the transmitted signal.

FIG. 2A is a diagram illustrating an example 201 of a communication device (CD) 110 operative within one or more communication systems. The device 110 includes a communication interface 220 and a processor 230. The communication interface 220 includes functionality of a transmitter 222 and a receiver 224 to support communications with one or more other devices within a communication system. The device 110 may also include memory 240 to store information including one or more signals generated by the device 110 or such information received from other devices (e.g., device 112) via one or more communication channels. Memory 240 may also include and store various operational instructions for use by the processor 230 in regards to the processing of messages and/or other received signals and generation of other messages and/or other signals including those described herein. Memory 240 may also store information including one or more types of encoding, one or more types of symbol mapping, concatenation of various modulation coding schemes, etc. as may be generated by the device 110 or such information received from other devices via one or more communication channels. The communication interface 220 supports communications to and from one or more other devices (e.g., CD 112 and/or other communication devices). Operation of the communication interface 220 may be directed by the processor 230 such that processor 230 transmits and receives signals (TX(s) and RX(s)) via the communication interface 220.

Generally speaking, the communication interface 220 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and or frequency downscaling, such as to a baseband frequency at which one or more of the components of the device 110 operates), equalization, pre-equalization, metric generation, symbol mapping and/or de-mapping, automatic gain control (AGC) operations, and/or any other operations that may be performed by an AFE and/or PHY component within a communication device.

Note that device 110 (CD 110) may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system.

In an example of operation, CD 110, which includes the communication interface 220 and the processor 230, receives a transmitted signal from CD 112. The CD 112 generates the transmitted signal based on predetermined digital data. The CD 110 generates a first reference signal based on a copy of the predetermined digital data and subtracts the first reference signal from the transmitted signal to generate a first residual signal. The CD 110 identifies at least one adaptation parameter based on the first residual signal and adapts the first reference signal using the at least one adaptation parameter to generate a second reference signal so that a first characteristic of the transmitted signal and a second characteristic of the second reference signal are approximately equal. The CD 110 subtracts the second reference signal from the transmitted signal to generate a second residual signal processes the second residual signal to characterize inband spurious emission within the transmitted signal.

In an example of operation, CD 110, which includes the communication interface 220 and the processor 230, receive a transmitted signal from CD 112. The CD 112 generates the transmitted signal based on predetermined digital data. The CD 110 performs forward error correction (FEC) decoding of the transmitted signal to generate an estimate of the transmitted signal and soft information associated with the transmitted signal. The CD 110 also generates a first reference signal based on a copy of the predetermined digital data and subtracts the first reference signal from the transmitted signal to generate a first residual signal. The CD 110 then identifies at least one adaptation parameter based on the first residual signal, the estimate of the transmitted signal, and the soft information associated with the transmitted signal. the CD 110 then the first reference signal using the at least one adaptation parameter to generate a second reference signal so that so that a first power of the transmitted signal and a second characteristic of the second reference signal are approximately equal and subtracts the second reference signal from the transmitted signal to generate a second residual signal. In some examples, the at least one adaptation parameter is based on at least one of amplitude fitting, phase fitting, or timing alignment. The CD 110 processes the second residual signal to characterize inband spurious emission within the transmitted signal.

In some examples, note that the CD 110 is configured to obtain or generate the (original) reference signal in a manner of ways including being provided a complete description of predetermined digital data. The transmitted signal provided into CD 110 is typically a high signal-to-noise ratio input enabling reliable estimation of any unknowns in the transmitted signal; the fewer the unknowns in the transmitted signal at CD 110 the greater the matching of the original reference signal will be to the transmitted signal.

FIG. 2B is a diagram illustrating another example 202 of a CD 110 operative within one or more communication systems. Device 110 supports communications to and from one or more other devices, such as device 112. In an example of operation, the CD 110 receives at least one transmitted signal from CD 112. Note also that CD 110 can transmit another signal or other signals to the CD 112. In this example 202, the CD 110 is directly connected or directly coupled to the CD 112. The CD 110 and the CD 112 may both be located within a test facility or environment such as a testing facility in which the CD 112 is being tested and characterized before being installed within a communication system or before being sold to a potential customer. In another example, the CD 112 may have been removed from an installation and brought into a test facility or environment for analysis of the CD 112. In another example, both the CD 110 the CD 112 are implemented within in communication system and directly connected or directly coupled to one another.

FIG. 2C is a diagram illustrating another example 203 of a CD operative within one or more communication systems. In this example 203, the CD 110 and the CD 112 are in communication with one another via one or more network segments 116. The one or more network segments 116 may be included within a test facility or environment for use to characterize the CD 112 based on its interaction and operation with the one or more network segments 116. In another example, the CD 110 and the CD 112 are in communication via the one or more network segments 116 when both the CD 110 and the CD 112 are implemented within the communication system. In another example, the CD 112 is implemented and installed within application system, and the CD 110 connects and/or communicates to a point, note, or other device within the communication system and receives a transmitted signal from the CD 112 for use to characterize inband spurious emission within the transmitted signal.

FIG. 2D is a diagram illustrating another example 204 of a CD operative within one or more communication systems. In this example 204, the CD 110 is a test device under the operational control the field operator 231. For example, network management, administration, etc. personnel may connect a test device, such as the CD 110, to the CD 112 to perform characterization of the operation of the CD 112 while the CD 112 is installed or implemented within a communication system. In this example 204, the field operator 231 brings the test device, the CD 110, to an appropriate location within communication system so that the CD 110 can receive a transmitted signal from CD 112.

Note that any other implementation besides these described above may be used for one device, such as the CD 110, to receive a transmitted signal from another device, such as the CD 112. Regardless of the particular implementation, the CD 110 is implemented to receive a transmitted signal from another device, such as the CD 112, and to perform various operations on and related to that transmitted signal to characterize inband spurious emission within the transmitted signal. Note that the reference to spurious emissions herein also includes any non-linear distortions such as based on operations within the CD 110.

FIG. 2E is a diagram illustrating an example 205 of processing to characterize spurious emissions that may exist in a signal transmitted from a CD. This diagram shows a transmitted signal (TX signal) undergoing processing in conjunction with the reference signal. The reference signal is subtracted from the transmitted signal to generate a residual signal. The processor 230 generates the reference signal based on predetermined digital data that is same or has similar characteristics as digital data used to generate the transmitted signal. In some instances, the processor 230 uses a copy of predetermined digital data that was used to generate the transmitted signal for use in generating the reference signal. Also, the processor 230 operates to perform adaptation of the reference signal. This adaptation is based on characterization of the residual signal. The processor 230 may perform different types and amounts of adaptation at different times. The processor 230 also identifies one or more annotation parameters for use to perform the adaptation of the reference signal. The processor 230 performs the adaptation of the reference signal so that the characteristic of the reference signal substantially matches the characteristic of the transmitted signal. Alternatively, the processor 230 may be viewed to perform adaptation of the reference signal so that any difference in characteristic between the reference signal and the transmitted signal is minimized.

When the same digital data is used for generation of both the reference on the transmitted signal, note that the reference signal and the transmitted signal would ideally be identical. However, in a real life and actual communication device, that communication device may unfortunately be adversely affected by any of a number of deleterious effects. For example, interference, noise, burst emissions, spurious emissions, thermal noise, Johnson noise, etc. and or other deleterious effects can reduce the perfect or ideal operation of a communication device.

The processor 230 generates the reference signal, and the processor 230 can then adapt the reference signal so that the characteristic of the reference signal in the transmitted signal are substantially or approximately equal. When this is performed, the processor 230 then generates a residual signal by subtracting the reference signal from the transmitted signal. The residual signal then includes only those unintentional, undesirable, etc. effects that may have unfortunately been coupled to or included within the transmitted signal during its generation within the communication device that generates the transmitted signal or during its transmission from that communication device. Note that certain interfaces of a communication device, such as connectors, couplings, ports, etc. may also unfortunately be adversely affected by any of a number of deleterious effects, such as when such as connectors, couplings, ports, etc. act as antennas and unfortunately couple unwanted emissions, radiation, signals, etc. into the transmitted signal from that communication device.

When the reference signal has been effectively removed from the transmitted signal to generate a residual signal, the processor 230 operates to perform processing of the residual signal to characterize inband spurious emission within the transmitted signal. The processor 230 can perform any of a number of operations including signal analysis, spectral analysis, signal characterization, etc. of the residual signal to determine characteristics thereof. In one implementation, the processor 230 compares the residual signal with one or more thresholds to determine whether or not the transmitted signal passes or fails a predetermined criteria of performance. For example, one performance criteria may require that the characteristic of the residual signal is less than a certain threshold (e.g., X dBmv, where X is some predetermined performance constraint). When the characteristic of the residual signal is greater than that threshold, then the communication device that generates the transmitted signal fails to comply with that predetermined performance constraint. Alternatively, when the characteristic of the residual signal is less than or equal to that threshold, then the communication device that generates the transmitted signal does comply with that predetermined performance constraint.

Note that the processor 230 may be configured to perform comparison with different respective thresholds to determine compliance or failure of compliance with any one or more different performance constraints (e.g., perform comparison with a first threshold to determine compliance or failure of compliance with a first performance constraint, perform comparison with a second threshold to determine compliance or failure of compliance with a second performance constraint, etc.).

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 52 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processor and the communication interface configured to process received OFDM or OFDMA symbols and/or frames (and/or SC symbols and/or frames) and to generate such OFDM or OFDMA symbols and/or frames (and/or SC symbols and/or frames). In some examples, the processor and the communication interface of the communication device are configured to perform such processing of signals described herein to characterize inband spurious emission within a transmitted signal that is based on OFDM, OFDMA, or SC signaling. In addition, with respect to OFDM or OFDMA signaling, such processing operations as described herein to characterize a transmitted signal may be targeted or specific to one given sub-carrier, a certain subset of sub-carriers, a certain frequency range within a given channel, frequency band, etc. Note also that such processing operations as described herein may be performed on different sub-carriers, channels, frequency bands, etc. at the same or different times.

In addition, such processing operations as described herein to characterize a transmitted signal may be performed over a particular number of OFDM/A symbols (e.g., X symbols where X is a positive integer greater than the 1). Note also that such processing operations as described herein may be performed multiple times on different sets of OFDM/A symbols (e.g., a first one or more OFDM/A symbols at or during a first time period, a second one or more OFDM/A symbols at or during a second time period, etc.).

Figure 4A:
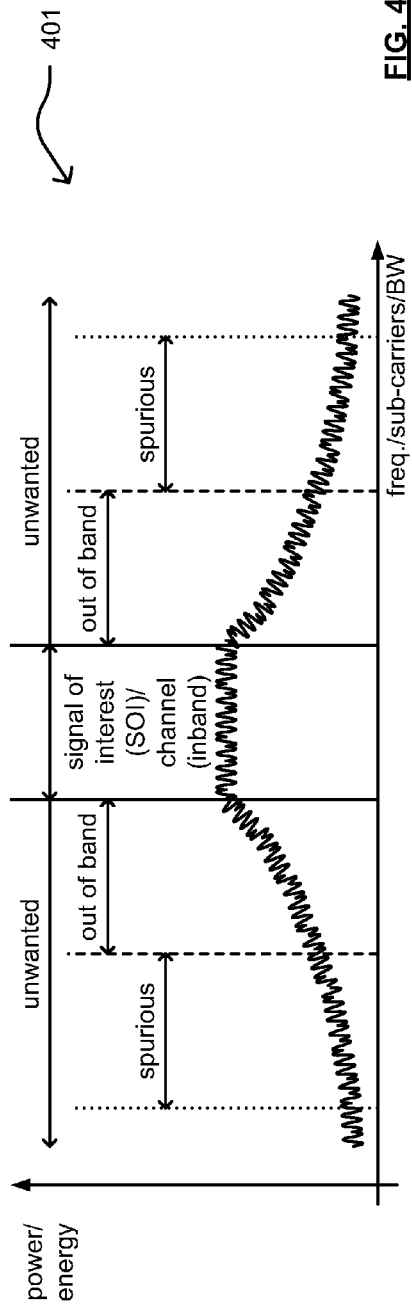
FIG. 4A is a diagram illustrating an example of power spectral density (PSD) showing different portions of frequency spectra.

FIG. 4A is a diagram illustrating an example 401 of power spectral density (PSD) showing different portions of frequency spectra. Generally speaking, a signal (or a signal of interest (SOI is located within a particular channel (or channel of interest). Signal power or energy within this portion of this frequency, sub-carriers, bandwidth, etc. is referred to as inband. Power or energy (e.g., emissions) located outside of this channel (or channel of interest) is referred to as out of band within a certain range and spurious and generally constitutes unwanted or undesired energy that can adversely affect the signal (or SOI). Unfortunately, certain power or energy (e.g., emissions) that is located outside of the channel (or channel of interest) may unfortunately adversely affect or be coupled into the signal (or SOI). Generally speaking, the signal (or SOI) is the desired signal that is intended to be transmitted from a first CD to a second CD. However, unfortunately, inband spurious emissions may unfortunately deleteriously affect the signal (or SOI). Such spurious emissions may be characterized in any of number of ways including as harmonic emissions, parasitic emissions, intermodulation products, frequency conversion products, etc., yet exclude out of band emissions. That is to say, spurious emissions, and specifically inband spurious emissions as described herein, are those that unfortunately adversely affect the signal (or SOI) within the channel (or channel of interest). Various embodiments, examples, etc. are provided herein to perform characterization of the inband spurious emissions that may unfortunately adversely affect a transmitted signal from a CD.

As another example of definition of spurious emission, The International Telecommunication Union (ITU), in Article 1, Terms and Definitions, Section VI. Characteristics of Emissions and Radio Equipment, defines spurious emission as follows: 1.145 spurious emission: Emission on a frequency or frequencies which are outside the necessary bandwidth and the level of which may be reduced without affecting the corresponding transmission of information. Spurious emissions include harmonic emissions, parasitic emissions, intermodulation products and frequency conversion products, but exclude out-of-band emissions.

Generally speaking, note that any emissions within the signal (or SOI) that have unfortunately been included within the channel (or channel of interest) may be characterized as spurious emissions.

Figure 4B:
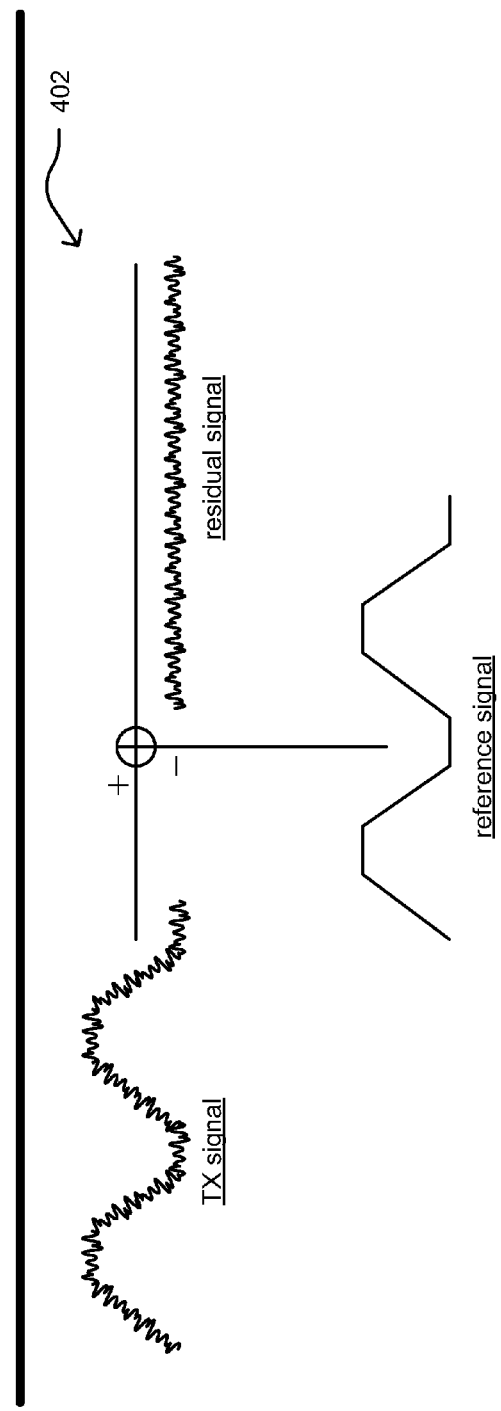
FIG. 4B is a diagram illustrating another example of processing to characterize spurious emissions that may exist in a signal transmitted from a CD.

FIG. 4B is a diagram illustrating another example 402 of processing to characterize spurious emissions that may exist in a signal transmitted from a CD. A reference signal is subtracted from a transmitted signal (TX signal) to generate a residual signal. The transmitted signal is unfortunately adversely affected by one or more effects. One example of such adverse effects includes inband spurious emissions. The reference signal is generated based on digital data that is same or similar to digital data used to generate the transmitted signal. The reference signal is adapted so that the characteristic of the reference signal and the transmitted signal are approximately are substantially equal or that the difference in characteristic between the reference signal in the transmitted signal is minimized. If the transmitted signal were unaffected by any adverse effects such as interference, noise, etc., then the residual signal would be exactly 0 since the reference signal and the transmitted signal would be identical to one another. However, in a real life or actual application, the transmitted signal can unfortunately be adversely affected by unwanted emissions including inband spurious emissions.

As can be seen in this diagram, the residual signal includes only those unwanted emissions that have been unfortunately coupled into or included within the transmitted signal during a generation or transmission from the communication device that generates a transmitted signal. In some instances, when the transmitted signal is transmitted via one or more network segments, the transmitted signal may also include any unwanted emissions that have been unfortunately coupled into or included within the transmitted signal during its transmission via the one or more network segments. A device processes the residual signal to characterize these unwanted emissions including to characterize inband spurious emissions within the transmitted signal.

This disclosure presents novel schemes to achieve a relatively better "transmit signal to noise ratio (SNR)" than can be provided using prior art approached including within communication devices and/or communication systems that operate based on one or more communication protocols, standards, and/or recommended practices.

In some instances, a "transmit SNR" may be achieved using these novel means that meets or exceeds a modulation error ratio (MER) measurement and specification (e.g., approximately 44 dB for a 100% grant and 50 dB for a 5% grant in one example). Considering such an example, the 5% grant may have approximately 13 dB less energy or power than the 100% grant so non-linear distortion due to non-linearity interacting with strong signals should be really reduced for the 5% grant.

Inband spurious is described in certain communication protocols, standards, and/or recommended practices (e.g., including as described above). However, such description in such communication protocols, standards, and/or recommended practices is often used as a "catch-all", and there is no none ways in the prior art known to test it.

This disclosure presents at least two ways of testing for such inband spurious emissions and to characterize such inband spurious emissions (e.g., noise, interference, etc. that can enter into a channel, sub-carrier, frequency band, etc., such as with respect to OFDM and/or OFDMA described above, and can deleteriously affect the performance of such a channel, sub-carrier, frequency band, etc.). In a practical implementation, a real issue can be that a demodulator within a communication device can be configured to expect a waveform that is to be the intended signal shaping, except for deviations due to imperfections, and that most deviations would be captured by such an MER test. However, there could be a case in which some deviation which eluded the MER testing and was yet still hurting the demodulators in the field (which are not precise test instruments).

This disclosure presents inband spurious detection and processing within communication systems including application to Data Over Cable Service Interface Specification (DOCSIS). This can be advantageous to communication devices and/or systems that eliminate the InBand Spurious requirement and rely only on MER. This disclosure presents means that may be combined with a bit error rate (BER) requirement for the transmitter that eliminate MER.

This disclosure also presents a method for detecting a transmitter communication device intentionally deviating from the intended transmitted waveform, which then eludes MER measurement. However, such an approach could possibly and potentially deleteriously affect a large number (e.g., 100s, millions, etc.) of communication devices (e.g., demodulators, such as within cable modems (CMs)) already in the field, such as when the transmitter is generating the cable downstream (DS). Other approaches operate by attempting to eliminate InBand Spurious as a requirement and rely only on MER. By the way, in some applications, the purpose of the deviations of the transmitted waveform is for peak reduction. However, this could jeopardize the functioning of certain communication devices (e.g., demodulators, such as within cable modems (CMs)) in the field, or worse, may be exploitable by another device or design. For example, some devices may be designed or implemented to modify a transmitted signal or insert something (e.g., a modification) into a transmitted signal that is not specified in a given standard, communication protocol, and/or recommended practice, yet other communication devices that are aware of this modification can operate advantageously based on it. Generally, other communication devices that know of such modification can operate better than communication devices that do not know such a modification. The characterization as performed herein can identify when such a modification is existent.

A test method to perform inband spurious detection and processing is to capture a communication device's (e.g., transmitter, such as within a CM) transmission and store it in a memory or cache after sampling it at high rate. This sampling may be performed synchronously with the downstream reference to that same communication device (e.g., transmitter, such as within a CM). Then, as may be performed in a synchronous code division multiple access (S-CDMA) communication device/receiver, in some of the processing modes, multipass demodulation may be performed. The signal may be regenerated after a first demodulation attempt, and that result is then subtracted from the received signal. Note that the upstream is with no noise except for that which is generated by the communication device (e.g., a CM) or unit under test.

This process may be repeated multiple times if desired, necessary, and/or helpful. Note that none of this functionality need necessarily be implemented in a mass-produced device, or in any real time. For example, this would be the case for multipass demodulation in a cable modem termination system (CMTS) for application in the field. This is very reasonable and could help with this development. Variants of such testing be develop to perform such tests early (e.g., internally) for communication device designers to know specifically the particulars of such a test.

Note that MER is very difficult to measure and may be assisted by allowing 44 dB instead of the higher values. Note that such a concession to practical measurement capability for MER allows transmitters to be unnecessarily "dirty" just because a tighter test limit is deemed impractical. MSOs (e.g., multiple system operators (MSOs), cable companies, etc.) may be really complicating their operation if they are interested in high density constellations, and they may be left to wonder where test measurement error will impact what the MSOs try to do. This may be true with respect to handheld units used by technicians in the field.

This disclosure presents a means to generate very good MER requirement, or even more discerning more general requirement on transmitter fidelity. This test may be used in a specification (e.g., developing or to-be-developed DOCSIS specification), for communication device (e.g., a CM). The impact of a lower MER (e.g., lower quality transmitter) (e.g., 44 dB) upon the link budgets and the desire for high density constellations upstream may be large.

This disclosure presents at least one application for testing a transmitter's inband spurious emissions (e.g., of a communication device's (CM's) transmitter). The process operates by subtracting out an estimate of the signal. This may be performed via iterative processing. This may alternatively be performed via repeated application of estimation and regeneration. This may alternatively be performed by including feedback from forward error correction (FEC) code and/or error correction code (ECC) decoding approaches or other redundancies in the transmission.

Such approaches within this disclosure may be performed using a relaxation of 2 dB for CM transmission inband spurious emissions. This places a requirement on an allocation or contributor to MER, and this requirement was currently 3 dB tougher than the MER requirement. Relaxation of this one parameter allocation or contributor is reasonable.

Figure 5A:
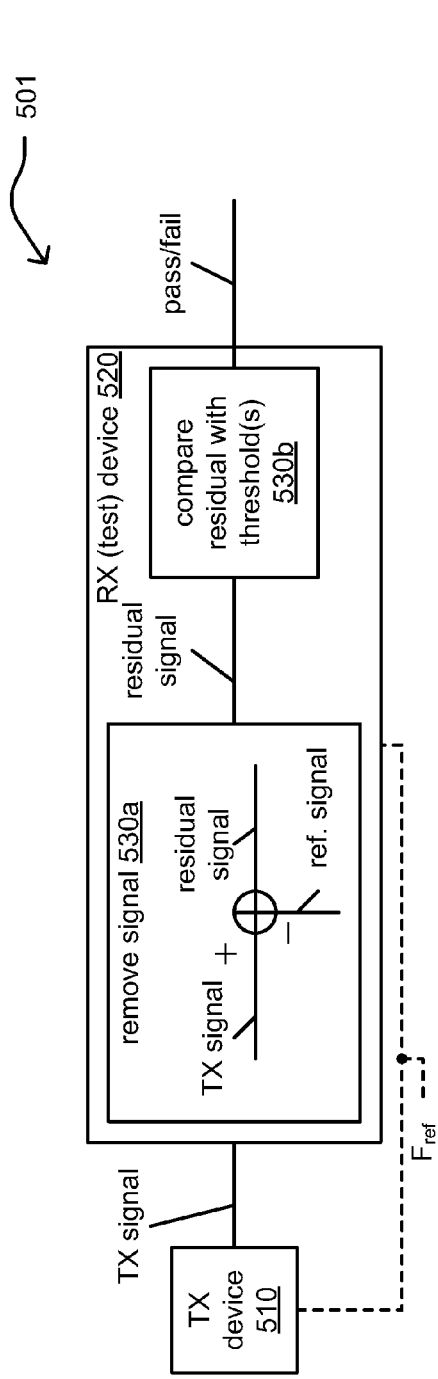
FIG. 5A is a diagram illustrating an example of inband spurious and distortion measurement and characterization.

FIG. 5A is a diagram illustrating an example 501 of inband spurious and distortion measurement and characterization. A transmitter communication device 510 (shown as TX device 510) transmits a transmitted signal (shown as TX signal) that is received by a receiver device 520 (shown as RX (test) device 520). This TX signal can include the transmitted information (signal, signal of interest (SOI) plus also any distortion, noise, interference, spurious, etc. A frequency reference (shown as $F_{ref}$) may be provided to both the TX device 510 and the RX (test) device 520 for various purposes including synchronization, timing alignment, coordination, etc. This frequency reference (shown as $F_{ref}$) may be provided by either the TX device 510 or the RX (test) device 520. This frequency reference (shown as $F_{ref}$) may be employed by the TX device 510 or the RX (test) device 520, sourced external to the two devices, or sourced by either of the two devices. This helps minimize the difference (improve the matching) of the reference signal to the transmitted signal, since frequency drift (and significant portions of phase noise) can occur and be in common for the two devices.

Figure 5B:
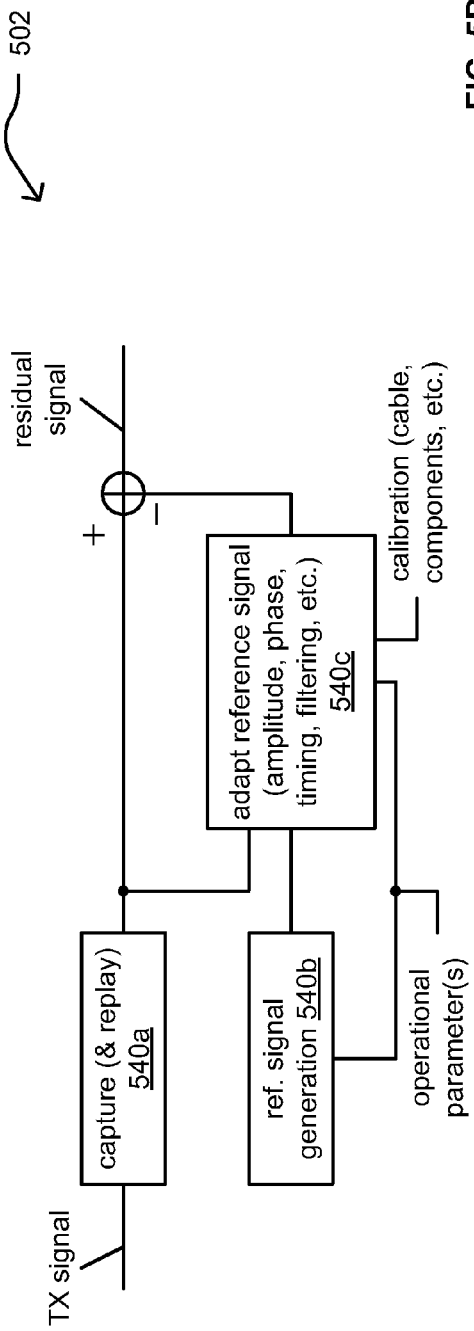
FIG. 5B is a diagram illustrating an example of reference signal removal from a transmitted signal to generate a residual signal.

The frequency reference (shown as $F_{ref}$) may be generated digitally in the RX (test) device 520 and may benefit from processing of the transmitted signal such as decisions on the transmitted waveform (e.g., which is high signal to noise ratio (SNR) at the input to the RX (test) device 520 compared to the typical applications of the TX device 510 when it is deployed in its network application) and may also include any FEC that is included in the transmitted signal. it may be advantageous to have complete knowledge of the transmitted signal and replicate it in the RX (test) device 520 to the greatest extent practically possible with some unknowns recognized and accounted for (e.g., in FIG. 5B as describe below).

In some examples, the RX (test) device 520 can be connected and/or coupled to the TX device 510 via calibrated cabling, connectors, etc. such that the frequency response of the interface, connections, couplings, etc. between the RX (test) device 520 and the TX device 510 so that the effects of such interface, connections, couplings, etc. can be accounted for when characterizing the transmitted signal provided from the TX device 510.

In other examples, the connection and/or coupling between the RX (test) device 520 and the TX device 510 is via a high attenuation path that minimizes return loss. Calibration signals such as continuous wave tones may be used to measure the frequency response of the TX device 510 to RX (test) device 520 very accurately. The RX (test) device 520 operates to perform a remove signal operation (reference numeral 530a).

The RX (test) device 520 generates a reference signal based on a copy of the predetermined digital data and subtracts the reference signal from the transmitted signal to generate a residual signal. The RX (test) device 520 identifies at least one adaptation parameter based on the first residual signal and adapts the reference signal using the at least one adaptation parameter (e.g., so that a first characteristic of the transmitted signal and a second characteristic of the reference signal are approximately equal). The RX (test) device 520 then subtracts the reference signal from the transmitted signal to generate the residual signal/an updated residual signal.

The RX (test) device 520's remove signal operation (reference numeral 530a) provides the residual signal/updated residual signal to a compare the residual signal with one or more thresholds operation (compare residual with threshold(s) 530b). The RX (test) device 520's compare the residual signal/updated residual signal with one or more thresholds operation (compare residual with threshold(s) 530b) compares the residual signal/updated residual signal with one or more thresholds to determine whether or not the transmitted signal passes or fails a predetermined criteria of performance. For example, one performance criteria may require that the characteristic of the residual signal is less than a certain threshold (e.g., X dBmv, where X is some predetermined performance constraint). When the characteristic of the residual signal/updated residual signal is greater than that threshold, then the TX device 510 that generates the transmitted signal fails to comply with that predetermined performance constraint. Alternatively, when the characteristic of the residual signal is less than or equal to that threshold, then the TX device 510 that generates the transmitted signal does comply with that predetermined performance constraint. Generally, the RX (test) device 520 operates to process the residual signal/updated residual signal to characterize inband spurious emission within the transmitted signal.

Sources of inband spurious may include clock signals, interference, etc. leaking or bleeding into the SOI (e.g., via electro-magnetic coupling). Inband spurious can adversely affect a transmitted signal due to a non-linear output vs. input transfer characteristic of a device (e.g., such as by operation of components such on power amplifier (PA), amplifier, compression component, etc. within the TX device 510). Other non-linear distortion sources include phase variation or delay variation as a function of signal amplitude, time-varying gain and/or phase, etc. There may be other sources of distortion or spurious emissions inband as well (e.g., "inband" being within the same spectral region as significant intended transmission energy, SOI, etc.).

In some examples, the TX device 510 performs peak mitigation or peak removal to reduce signal amplitude peaking of the transmitted signal to reduce the amount of compression introduced by some components therein. Some peak mitigation techniques include adding energy which reduces the peaks but is relatively minor in comparison to any matched filter processing and decision operations. Also, a sampling time can be optimized within the RX (test) device 520 to maximize the signal and minimize distortion. Energy added to reduce peaks may be constructed to be negligible in the matched filter at a near optimal sampling time. Note that such peak mitigation techniques t the sampling time for the decisions in the RX (test) device 520 are often based on an assumption of an ideal channel between the TX device 510 and the RX (test) device 520 and only considering non-linearity within the TX device 510. The TX device 510 may also be configured to perform pre-distortion techniques. However, note that such approaches may not be adequate for actual deployment of communication devices in communication networks, because energy created by the peak mitigation techniques may be undetected by the RX (test) device 520 in a nearly ideal lab or test facility (e.g., showing matched filter and nearly optimal sampling time). When actually implemented in the field (e.g., in the communication network), such extraneous energy may interact with the environment (e.g., echoes, mixing, other non-linear distortion) and manifest into power or energy that is destructive to the performance of the receiver communication devices in the field (e.g., that may work adequately in the absence of the invisible or undetected energy in the transmitted waveform or prior to its interaction with the real-world environment).

The transmitted signal send from the TX device 510 to the RX (test) device 520 may be viewed as including the ideal transmitted signal, reference signal, and residual signal where the residual signal includes imperfections in the transmitted signal such as spurious emissions, distortion, noise, etc. The distortion in this case is non-linear distortion. Note that distortion due to linear filtering is not intended to be included in the measurement.

In order to measure distortion and spurious emissions at a particular level (e.g., 40 dB) below the transmitted signal level in the SOI channel (e.g., FIG. 4A), the RX (test) device 520 substantially removes (subtracts) the ideal transmitted signal (the reference signal) from the transmitted signal thereby leaving the distortion and spurious emissions within the residual signal. Removal of the ideal transmitted signal (the reference signal) from the transmitted signal to large extents (e.g., 40 dB and more) uses improved means of matching of the ideal transmitted signal to the actual transmitted signal as described herein.

Linear distortion is removed and such distortion is minimized in one step. In some examples, a cable connection between the TX device 510 and the RX (test) device 520 is a high attenuation path that minimizes any standing wave created by impedance mismatching (e.g., return loss) at the two devices, and this can introduce linear distortion. The TX device 510 can be operated at a relatively high power in its power range, and using high attenuation pads (e.g., ohmic losses) at the connectors of the two devices. Higher amounts of attenuation minimize linear distortion, but a strong signal is still desired at the RX (test) device 520 to keep noise therein (including thermal noise of the device and ohmic losses) from causing a low signal to noise ratio (SNR). The noise from the RX (test) device 520 is then low enough to not mask imperfections of the TX device 510 desired to be measured. Note that the amount of noise introduced by the RX (test) device 520 need not be orders of magnitude below the measurement threshold of the inband spurious and distortion. If it is within an order of magnitude, the amount of noise contributed by the RX (test) device 520 can be calibrated and accounted for in the setting of test pass/fail threshold(s).

Note that such characterization and calibration as performed herein also accounts for linear distortion caused by the TX device 510, including analog components including those of the RX (test) device 520, cabling and return losses, etc.

Note also that the transmitted signal need not be processed in real time (e.g., as in a receiver operating in network application). It is possible to capture the transmitted signal (e.g., using an analog to digital converter (ADC) and digital memory) and perform repeated operations and refinements in creating and matching the reference signal to the transmitted signal.

Once the reference signal is substantially removed from the transmitted signal, the residual is processed to determine (e.g., to an extent necessary based on the quantitative requirement limiting the inband spurious and distortion) the presence (or amount) of inband spurious and distortion, and then there is a comparison to one or more thresholds to determine if the TX device 510 is clean enough or passes compliance or fails compliance.

In another example of operation, the RX (test) device 520 is configured to perform filtering of the residual signal to approximate the bandwidth of a component of the TX signal (e.g., a subcarrier bandwidth in an OFDM or OFDMA signal) or of a single channel of an ensemble or combination of channels in which one or more of the channels is a Single Carrier quadrature amplitude modulation (QAM) signal (SC-QAM) (e.g., such as may be employed when operating in accordance with DOCSIS). In this example, the filtering of the residual signal matches the signal type of the same spectrum. In some examples, in the range of spectrum where OFDM/A is transmitted, the RX (test) device 520 uses bandpass filtering to approximate a subcarrier bandwidth. After such processing, in this or other embodiments, the RX (test) device 520 processes the bandpass filtered signal using envelope detection (e.g., or alternatively, another form of detection such as square law detection). In addition, post detection operations may be performed including further filtering the detected signal using other filtered (e.g., low pass filtering, band pass filtering, other filtering, time averaging, moving window integration, etc. and/or other filtering).

Note that the RX (test) device 520 can be configured to selectively apply a particular amount of post-detection integration prior to threshold comparison in various examples. For example, depending on characteristics of the transmitted waveform and its robustness to various impairments (e.g., burst events, which may be due to interleaving and FEC, and other characteristics) as may be imparted into the transmitted signal.

Note that the RX (test) device 520 can be configured to reduce random noise, which is induced fluctuations or signal waveform dependent fluctuations that are due to nonlinear distortion and that exits in the post-detected waveform which are not attributable to the transmitted signal device imperfections, by the post-detection filtering (averaging), to produce a signal for comparison to a threshold for pass/fail. In some examples, the RX (test) device 520 performs time averaging of the post-detected waveform using a certain number of symbols (e.g., thousands of symbols, where a symbol duration is roughly the inverse of the signal bandwidth of the spectral bandpass filter prior to detection). In some other examples, the RX (test) device 520 performs spectral filtering prior to detection in a manner that is substantially less than the signal bandwidth in the same spectrum (e.g., within an OFDM spectrum a pre-detection filtering bandwidth of one-tenth the subcarrier spacing).

In such cases, the post-detection filtering (averaging time) may be substantially longer (e.g., 10× longer or even 100× longer). In one embodiment the pre-detection bandpass filtering is configurable to match the signal characteristics in the various portions of the spectrum, and also the post-detection filtering is configurable to average a range of a number of symbols (e.g., such as over one to tens of thousands of symbols). In another example, the post-detection waveform is processed to determine the highest energy portions of the post-detected residual signal, for tagging and capturing and further analysis.

FIG. 5B is a diagram illustrating an example 502 of reference signal removal from a transmitted signal to generate a residual signal. In this diagram, a transmitted signal (shown as TX signal) is provided to a capture (& replay) operation (reference numeral 540*a*). This TX signal is provided from the capture (& replay) operation (reference numeral 540*a*) and an adapted reference signal is subtracted there from to generate a residual signal. The reference signal is generated in block 540*b* and is provided to the block 540*c* where the reference signal undergoes adaptation to generate the adapted reference signal.

The block 540*c* is configured to adapt the reference signal performing any of a number of operations including amplitude fitting, phase fitting, timing adjustment, filtering, etc. Also, the block 540*c* can be implemented to receive information related to calibration of other elements (e.g., of cable, components, etc.) within the system.

In addition, the block 540*b* and the block 540*c* can receive information based on one or more operational parameters. Such operational parameters may include information related to transmitter signal parameters, frequency reference, etc.

Generally, the residual signal is generated by subtracting the adapted reference signal from the transmitted signal. This diagram shows an iterative process by which the reference signal may undergo adaptation, any number of times, continuously, continually, etc. based on the operations of the block 540*c*.

FIG. 6A is a diagram illustrating an example 601 of reference signal adaptation using amplitude fitting. This diagram shows adaptation of a first reference signal to generate one or more second reference signals based on amplitude fitting. Adaptation of the first reference signal is performed to generate a second reference signal having a characteristic that substantially or approximately matches the characteristic of a transmitted signal.

With respect to performing amplitude fitting, the magnitude or amplitude of the reference signal is increased or decreased based on at least one adaptation parameter that has been identified based on a residual signal. On the right-hand side of this diagram, the upper signal includes an adapted reference signal whose amplitude has been increased relative to the reference signal in the left hand side of the diagram. On the right-hand side of this diagram, the bottom signal includes an adapted reference signal whose amplitude has been decreased relative to the reference signal in the left hand side of the diagram.

FIG. 6B is a diagram illustrating an example 602 of reference signal adaptation using phase fitting. This diagram shows adaptation of a first reference signal to generate one or more second reference signals based on phase fitting. Adaptation of the first reference signal is performed to generate a second reference signal having a characteristic that substantially or approximately matches the characteristic of a transmitted signal.

With respect to performing phase fitting, the phase of the reference signal is increased or decreased based on at least one adaptation parameter that has been identified based on a residual signal. On the right-hand side of this diagram, the upper signal includes an adapted reference signal whose phase has been increased relative to the reference signal in the left hand side of the diagram. On the right-hand side of this diagram, the bottom signal includes an adapted reference signal whose phase has been decreased relative to the reference signal in the left hand side of the diagram.

FIG. 6C is a diagram illustrating an example 603 of reference signal adaptation using timing alignment. This diagram shows adaptation of a first reference signal to generate one or more second reference signals based on timing alignment adaptation of the first reference signal is performed to generate a second reference signal having a characteristic that substantially or approximately matches the characteristic of a transmitted signal.

With respect to performing timing alignment, the timing alignment of the reference signal is shifted forward or backwards based on at least one adaptation parameter that has been identified based on a residual signal. On the right-hand side of this diagram, the upper signal includes an adapted reference signal whose timing alignment has been shifted to the right or increased relative to the reference signal in the left hand side of the diagram. On the right-hand side of this diagram, the bottom signal includes an adapted reference signal whose timing alignment has been shifted to the left or decreased relative to the reference signal in the left hand side of the diagram.

Note that such operations of amplitude fitting, phase fitting, timing alignment, etc. as described herein are examples of various operations that may be performed to a reference signal to generate an adapted reference signal.

Note also that any of these various operations may be performed in conjunction with one another. For example, both amplitude fitting and phase fitting adaptation operations may be performed on a reference signal to generate an adapted reference signal. In another example, amplitude fitting, phase fitting, and timing alignment operations may be performed on a reference signal to generate an adapted reference signal. In other examples, only one of amplitude fitting, phase fitting, or timing alignment operations may be performed on a reference signal to generate an adapted reference signal.

Note also that different types of filtering, decoding including decoding operations the generate soft information (e.g., such as in accordance with forward error correction (FEC) code decoding and/or error correction code (ECC) decoding) may be performed on a transmitted signal to generate an estimate of the transmitted signal and soft information associated with the estimated signal. For example, certain types of FEC code and/or ECC operate on a signal to generate soft information for use in generating an estimate (e.g., a best estimate or a final estimate) of that signal. A device may be configured to generate such soft information and to use that soft information to identify which one or more adaptation operations should be performed on a reference signal to generate an adapted reference signal.

Note that while the particular shape of signals used herein, such as with respect to FIG. 4B, FIG. 6A FIG. 6B, and FIG. 6C, has a particular shape, note that in general, any signal having any shape (e.g., sawtooth, sinusoid, linear, monotonically increasing or decreasing, quadratic, exponential, etc.) may be used to generate a reference signal and undergo modification or adaptation to generate an adapted reference signal for use in subtraction from a transmitted signal to generate a residual signal.

FIG. 7A is a diagram illustrating an example 701 of reference signal removal from a transmitted signal to generate a residual signal including adaptation of the reference signal. This diagram shows reference model adjustment when performing reference signal removal. An adapted reference signal is subtracted from a captured transmitted signal (captured TX signal) to generate a residual signal. A power measurement block (shown by reference numeral 705) performs filtering of inband portion of the residual signal. The power measurement block 705 measures the power of the residual signal as a function of time. The power measurement block 705 can also measure energy, and it may also measure energy as a function of frequency. This power measurement block 705 identifies one or more operational parameters for use to adjust the reference signal. An adjustment block 735 (shown by reference numeral 735 with a line extending through it) operates such that any characteristic of the reference signal provided thereto may undergo adaptation using any one or more of the various examples provided herein.

A correlator 715 operates to process both the adapted reference signal and the residual signal to determine shared characteristics. The correlator 715 can provide information in one or both of the time domain (TDOM) and the frequency domain (FDOM) to an analyzer 725. The analyzer 725 may be configured to perform any of a number of processes or operations including signal analysis, spectral analysis, signal characterization, etc. The analyzer 725 determines operational parameter adjustment based on the analysis that it performs using information provided from the correlator 715. The analyzer 725 identifies at least one operational parameter for use in adapting the reference signal. In some examples, the adjustment block 735 then adapts the reference signal appropriately so that power or energy of the captured transmitted signal substantially or approximately matches or energy of the adapted reference signal.

In another example, the correlator frequency domain output (output from the correlator 715) may be analyzed and show that the adapted reference signal and the residual signal are lowly or poorly correlated at DC (e.g., complex baseband version) but are somewhat more correlated at other portions of the spectrum. This can indicate that there is linear filtering in the transmitted signal path that has not yet been incorporated into the reference adaptation path. In an example that includes a tilt of the spectrum of the transmitted signal that is not matched in the adapted reference signal, this will be manifested as increasing correlation in the spectrum produced by the correlator as the frequency increases from 0 Hz (complex baseband). Providing the linear filtering indicated by the correlator output into the adaptation of the reference signal allows for substantial improvement in reducing the residual signal power. In one example, the correlator output may be analyzed in automated fashion with polynomial fitting routines to estimate a good filter order for the adaptation. In another embodiment the correlator results are provided to an analyst who manipulates the data to determine a good model for the filtering to be introduced into the adaptation path. These are steps not typically enabled within an in-service real-time operable communication device, yet it which allow the test approach to achieve significantly higher performance (and thus enable requirements mandating higher quality, testable transmitters).

FIG. 7B is a diagram illustrating an embodiment of a method 702 for execution by one or more communication devices and that performs reference signal removal from a transmitted signal to generate a residual signal using parsing.

The method 702 begins by capturing a transmitted signal (TX signal) (block 710). The method 702 continues by generating a reference signal (block 720). The method 702 then operates by performing residual energy minimization (block 730). Operations of the block 730 may include adjusting the reference signal to match the characteristic of the TX signal.

The method 702 continues by parsing the TX signal and the reference signal in the time domain (TDOM) (block 740). The method 702 continues by analyzing each parsed segment of the TX signal and the reference signal (block 750).

The method 702 then operates by removing one or more high energy (or high power) residuals within the respective parsed segments of the TX signal and the reference signal (block 760). The removal operations of the block 760 may include consideration of time domain power peaking that is not coincident with a high-power reference signal. For example, such non-coincidental energy (or power) may be assumed to be spurious and removed from the reference signal. Residual energy (or power) minimization may be repeated multiple times if desired. With respect to frequency domain (FDOM) energy (or power) peaking, the operations may scan for narrow and or high peaks. A time-sparse spectrum may be applied for slightly wider peaks within the frequency domain (FDOM). Based on such analysis, those portions of the spectrum found to be above a particular threshold may be removed from the residual energy (or power) minimization process. Again, regardless of the particular implementation used in a given instance, this process may be repeated multiple times if desired.

The method 702 continues by determining whether or not any respective parsed segments are worse than average (decision block 770). When it is determined that no parsed segments are worse than average (decision block 770), then the method 702 branches to end. Alternatively, when it is determined that there are one or more parsed segments that are worse than average (decision block 770), then the method 702 branches to the block 780 where the method 702 operates to adapt those one or more parts segments that are worse than average (block 780).

Note that the adaptation operations performed within the block 780 may include adapting one or more operational parameters, analyzing a model used to generate the reference signal, reducing the residual signal components in one or more of the respective parsed segments (e.g., such as those that have high energy (or high power) residuals), etc. Note that such adaptation operations performed within the block 780 within any one or more of the respective parsed segments that have been identified for undergoing adaptation may selectively be performed in a manner so as not to increase any other of those parsed segments.

Figures 8A, 8B:
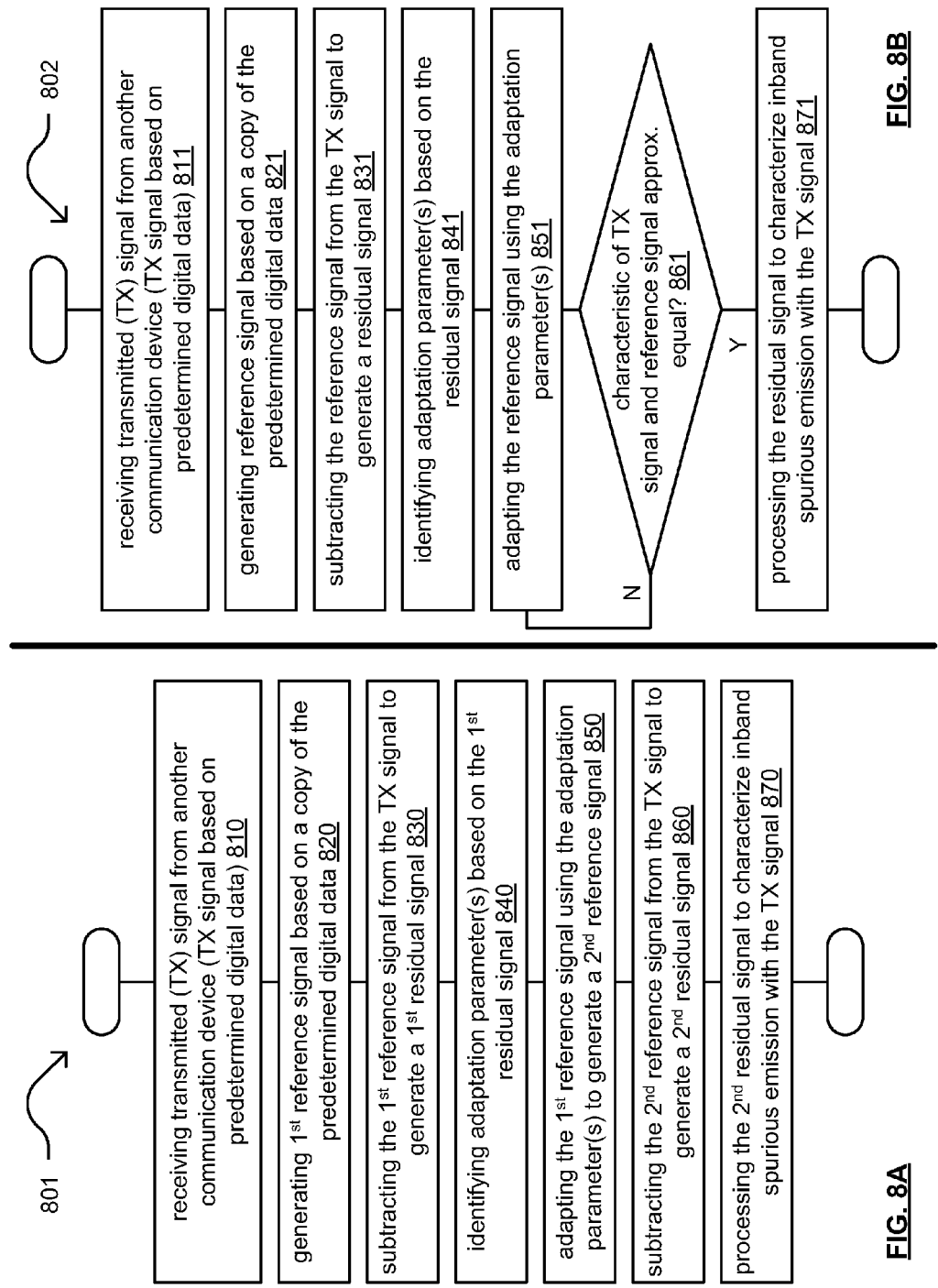
FIG. 8A is a diagram illustrating another embodiment of a method for execution by one or more communication devices.
FIG. 8B is a diagram illustrating another embodiment of a method for execution by one or more communication devices.

FIG. 8A is a diagram illustrating another embodiment of a method 801 for execution by one or more communication devices. The method 801 begins by receiving (e.g., via a communication interface of the communication device) a transmitted signal from another communication device (block 810). The transmitted signal is generated within the another communication device based on predetermined digital data. The method 801 continues by generating a first reference signal based on a copy of the predetermined digital data (block 820).

The method 801 then operates by subtracting the first reference signal from the transmitted signal to generate a first residual signal (block 830). The method 801 continues by identifying at least one adaptation parameter based on the first residual signal (block 840).

The method 801 continues by adapting the first reference signal using the at least one adaptation parameter to generate a second reference signal so that a first characteristic of the transmitted signal and a second characteristic of the second reference signal are approximately equal (block 850).

The method 801 then operates by subtracting the second reference signal from the transmitted signal to generate a second residual signal (block 860). The method 801 continues by processing the second residual signal to characterize inband spurious emission within the transmitted signal (block 870).

FIG. 8B is a diagram illustrating another embodiment of a method 802 for execution by one or more communication devices. The method 802 begins by receiving (e.g., via a communication interface of the communication device) a transmitted signal from another communication device (block 811). The transmitted signal is generated within the another communication device based on predetermined digital data. The method 802 continues by generating a reference signal based on a copy of the predetermined digital data (block 821).

The method 802 then operates by subtracting the reference signal from the transmitted signal to generate a residual signal (block 831). The method 802 continues by identifying at least one adaptation parameter based on the residual signal (block 840).

The method 802 continues by adapting the reference signal using the at least one adaptation parameter to generate an adapted reference signal (block 851).

The method 802 then operates by determining whether the characteristic of the transmitted signal and the reference signal are approximately or substantially equal (e.g., the difference in power or energy of the transmitted signal and the reference signal are approximately or substantially minimized) (decision block 861).

When the characteristic of the transmitted signal and the reference signal are not approximately or substantially equal (e.g., the difference in power or energy of the transmitted signal and the reference signal are not approximately or substantially minimized) (decision block 861), the method 802 branches back to block 851, and the method 802 continues by continuing to perform adapting of the reference signal using the at least one adaptation parameter (and/or at least one additional adaptation parameter) to generate the adapted reference signal and/or to adapt further the adapted reference signal (block 851).

Alternatively, when the characteristic of the transmitted signal and the reference signal are approximately or substantially equal (e.g., the difference in the characteristic of the transmitted signal and the reference signal are approximately or substantially minimized) (decision block 861), the method 802 branches to block 871, and the method 802 then operates by processing the residual signal (e.g., generated based on the transmitted signal and the reference signal and/or the adapted reference signal) to characterize inband spurious emission within the transmitted signal (block 871).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
  a communication interface; and
  a processor, the processor and the communication interface configured to:
    receive a transmitted signal from another communication device, wherein the transmitted signal is generated within the another communication device based on predetermined digital data;
    perform forward error correction (FEC) decoding of the transmitted signal to generate an estimate of the transmitted signal and soft information associated with the transmitted signal;
    generate a first reference signal based on a copy of the predetermined digital data;
    subtract the first reference signal from the transmitted signal to generate a first residual signal;
    identify at least one adaptation parameter based on the first residual signal, the estimate of the transmitted signal, and the soft information associated with the transmitted signal;
    adapt the first reference signal using the at least one adaptation parameter to generate a second reference signal so that a first characteristic of the transmitted signal and a second characteristic of the second reference signal are approximately equal;
    subtract the second reference signal from the transmitted signal to generate a second residual signal; and process the second residual signal to characterize inband spurious emission within the transmitted signal.

2. The communication device of claim 1, wherein the processor and the communication interface are further configured to:
adapt the first reference signal using at least one of amplitude fitting, phase fitting, or timing alignment to generate the second reference signal so that the first characteristic of the transmitted signal and the second characteristic of the second reference signal are approximately equal.

3. The communication device of claim 1, wherein the processor and the communication interface are further configured to:
process the second residual signal using iterative processing to characterize inband spurious emission within the transmitted signal;
filter the second residual signal during a first iteration to generate a first filtered residual signal;
compare the first filtered residual signal to a threshold to determine a first measure of the inband spurious emission;
filter the first filtered residual signal during a second iteration to generate a second filtered residual signal; and
compare the second filtered residual signal to the threshold or another threshold to determine a second measure of the inband spurious emission.

4. The communication device of claim 1, wherein the another communication device includes a cable modem.

5. The communication device of claim 1, wherein:
the another communication device is a cable modem implemented within a cable-based communication system; and
the communication device includes a mobile test communication device configured to receive the transmitted signal from the another communication device during a first time period and to receive another transmitted signal from at least one other communication device during a second time period.

6. The communication device of claim 1, wherein the communication device and the another communication device are implemented within a test facility, and the communication device is directly connected or coupled to the another communication device to receive the transmitted signal from the another communication device.

7. The communication device of claim 1 further comprising:
a test communication device, wherein the another communication device is a cable modem.

8. The communication device of claim 1, wherein the processor and the communication interface are further configured to:
support communications within at least one of a satellite communication system, a wireless communication system, a wired communication system, a fiber-optic communication system, or a mobile communication system.

9. A communication device comprising:
a communication interface; and
a processor, the processor and the communication interface configured to:
receive a transmitted signal from another communication device, wherein the transmitted signal is generated within the another communication device based on predetermined digital data;
perform forward error correction (FEC) decoding of the transmitted signal to generate an estimate of the transmitted signal and soft information associated with the transmitted signal;
generate a first reference signal based on a copy of the predetermined digital data;
subtract the first reference signal from the transmitted signal to generate a first residual signal;
identify at least one adaptation parameter based on the first residual signal, the estimate of the transmitted signal, and the soft information associated with the transmitted signal;
adapt the first reference signal using the at least one adaptation parameter to generate a second reference signal so that so that a first characteristic of the transmitted signal and a second characteristic of the second reference signal are approximately equal, wherein the at least one adaptation parameter is based on at least one of amplitude fitting, phase fitting, or timing alignment;
subtract the second reference signal from the transmitted signal to generate a second residual signal; and
process the second residual signal to characterize inband spurious emission within the transmitted signal.

10. The communication device of claim 9, wherein the processor and the communication interface are further configured to:
process the second residual signal using iterative processing to characterize inband spurious emission within the transmitted signal;
filter the second residual signal during a first iteration to generate a first filtered residual signal;
compare the first filtered residual signal to a threshold to determine a first measure of the inband spurious emission;
filter the first filtered residual signal during a second iteration to generate a second filtered residual signal; and
compare the second filtered residual signal to the threshold or another threshold to determine a second measure of the inband spurious emission.

11. The communication device of claim 9, wherein:
the another communication device is a cable modem implemented within a cable-based communication system; and
the communication device includes a mobile test communication device configured to receive the transmitted signal from the another communication device during a first time period and to receive another transmitted signal from at least one other communication device during a second time period.

12. The communication device of claim 9 further comprising:
a test communication device, wherein the another communication device is a cable modem.

13. The communication device of claim 9, wherein the processor and the communication interface are further configured to:
support communications within at least one of a satellite communication system, a wireless communication system, a wired communication system, a fiber-optic communication system, or a mobile communication system.

14. A method for execution by a communication device, the method comprising:

receiving, via a communication interface of the communication device, a transmitted signal from another communication device, wherein the transmitted signal is generated within the another communication device based on predetermined digital data;

performing forward error correction (FEC) decoding of the transmitted signal to generate an estimate of the transmitted signal and soft information associated with the transmitted signal;

generating a first reference signal based on a copy of the predetermined digital data;

subtracting the first reference signal from the transmitted signal to generate a first residual signal;

identifying at least one adaptation parameter based on the first residual signal, the estimate of the transmitted signal, and the soft information associated with the transmitted signal;

adapting the first reference signal using the at least one adaptation parameter to generate a second reference signal so that a first characteristic of the transmitted signal and a second characteristic of the second reference signal are approximately equal;

subtracting the second reference signal from the transmitted signal to generate a second residual signal; and processing the second residual signal to characterize inband spurious emission within the transmitted signal.

15. The method of claim 14 further comprising:
adapting the first reference signal using at least one of amplitude fitting, phase fitting, or timing alignment to generate the second reference signal so that the first characteristic of the transmitted signal and the second characteristic of the second reference signal are approximately equal.

16. The method of claim 14 further comprising:
processing the second residual signal using iterative processing to characterize inband spurious emission within the transmitted signal;
filtering the second residual signal during a first iteration to generate a first filtered residual signal;
comparing the first filtered residual signal to a threshold to determine a first measure of the inband spurious emission;
filtering the first filtered residual signal during a second iteration to generate a second filtered residual signal; and
comparing the second filtered residual signal to the threshold or another threshold to determine a second measure of the inband spurious emission.

17. The method of claim 14, wherein the another communication device includes a cable modem.

18. The method of claim 14, wherein the communication device and the another communication device are implemented within a test facility, and the communication device is directly connected or coupled to the another communication device to receive the transmitted signal from the another communication device.

19. The method of claim 14, wherein the communication device is a test communication device, and the another communication device is a cable modem.

20. The method of claim 14 further comprising:
operating the communication interface of the communication device to support communications within at least one of a satellite communication system, a wireless communication system, a wired communication system, a fiber-optic communication system, or a mobile communication system.

21. A communication device comprising:
a communication interface; and
a processor, the processor and the communication interface configured to:
receive a transmitted signal from another communication device, wherein the transmitted signal is generated within the another communication device based on predetermined digital data;
generate a first reference signal based on a copy of the predetermined digital data;
subtract the first reference signal from the transmitted signal to generate a first residual signal;
identify at least one adaptation parameter based on the first residual signal;
adapt the first reference signal using the at least one adaptation parameter to generate a second reference signal so that a first characteristic of the transmitted signal and a second characteristic of the second reference signal are approximately equal;
subtract the second reference signal from the transmitted signal to generate a second residual signal;
process the second residual signal using iterative processing to characterize inband spurious emission within the transmitted signal;
filter the second residual signal during a first iteration to generate a first filtered residual signal;
compare the first filtered residual signal to a threshold to determine a first measure of the inband spurious emission;
filter the first filtered residual signal during a second iteration to generate a second filtered residual signal; and
compare the second filtered residual signal to the threshold or another threshold to determine a second measure of the inband spurious emission.

22. A method for execution by a communication device, the method comprising:
receiving, via a communication interface of the communication device, a transmitted signal from another communication device, wherein the transmitted signal is generated within the another communication device based on predetermined digital data;
generating a first reference signal based on a copy of the predetermined digital data;
subtracting the first reference signal from the transmitted signal to generate a first residual signal;
identifying at least one adaptation parameter based on the first residual signal;
adapting the first reference signal using the at least one adaptation parameter to generate a second reference signal so that a first characteristic of the transmitted signal and a second characteristic of the second reference signal are approximately equal;
subtracting the second reference signal from the transmitted signal to generate a second residual signal;
processing the second residual signal using iterative processing to characterize inband spurious emission within the transmitted signal;
filtering the second residual signal during a first iteration to generate a first filtered residual signal;
comparing the first filtered residual signal to a threshold to determine a first measure of the inband spurious emission;
filtering the first filtered residual signal during a second iteration to generate a second filtered residual signal; and comparing the second filtered residual signal to the threshold or another threshold to determine a second measure of the inband spurious emission.

\* \* \* \* \*